United States Patent [19]

Stevens et al.

[11] Patent Number: 4,994,214
[45] Date of Patent: Feb. 19, 1991

[54] PROCESS FOR CONTROLLING THE CURL OF PHOTOGRAPHIC FILM

[75] Inventors: Marc P. Stevens, Belsele; Gery Vancoppenolle, Weerde, both of Belgium

[73] Assignee: Agfa-Gevaert, N.V., Mortsel, Belgium

[21] Appl. No.: 372,843

[22] Filed: Jun. 29, 1989

[30] Foreign Application Priority Data

Jul. 5, 1988 [EP] European Pat. Off. ........ 88201401.2

[51] Int. Cl.$^5$ ............. B29C 35/10; B29C 55/12; B29C 71/02
[52] U.S. Cl. ........................... 264/25; 264/134; 264/146; 264/160; 264/171; 264/210.5; 264/210.7; 264/211.18; 264/211.2; 264/235.8; 264/237; 264/239.6; 264/342 RE
[58] Field of Search ......... 264/25, 134, 146, 160, 264/171, 210.5, 210.7, 211.18, 211.2, 235.8, 237, 342 R, 342 RE, 289.6; 427/289.6

[56] References Cited

U.S. PATENT DOCUMENTS

| | | | |
|---|---|---|---|
| 3,426,115 | 2/1969 | Taber | 264/160 |
| 3,873,664 | 3/1975 | Curtis et al. | 264/146 |
| 4,093,695 | 6/1978 | Heirbaut | 264/342 RE X |
| 4,140,740 | 2/1979 | DeSmedt et al. | 264/146 |
| 4,141,735 | 2/1979 | Schrader et al. | 264/342 R X |
| 4,293,508 | 10/1981 | Heirbaut et al. | 264/25 |
| 4,892,689 | 1/1990 | Van Cappellen et al. | 264/25 |

FOREIGN PATENT DOCUMENTS

| | | |
|---|---|---|
| 22278 | 1/1981 | European Pat. Off. |
| 299560 | 1/1989 | European Pat. Off. |
| 1030288 | 5/1966 | United Kingdom |

*Primary Examiner*—Jeffery Thurlow
*Assistant Examiner*—Leo B. Tentoni
*Attorney, Agent, or Firm*—William J. Daniel

[57] ABSTRACT

A process of making biaxially oriented polyethylene terephthalate photographic film having a controlled amount of curl in the longitudinal direction, wherein the file is subjected to longitudinal stretching while being asymmetrically heated across its thickness, then wound into a stock roll, and the stock roll thus obtained is heat-tempered. The stock roll after heat-tempering may be longitudinally slit, cut and rewound into smaller rolls in a winding direction opposite to the direction of the longitudinal curl induced in the film during the longitudinal asymmetrical heat-stretching.

13 Claims, 5 Drawing Sheets

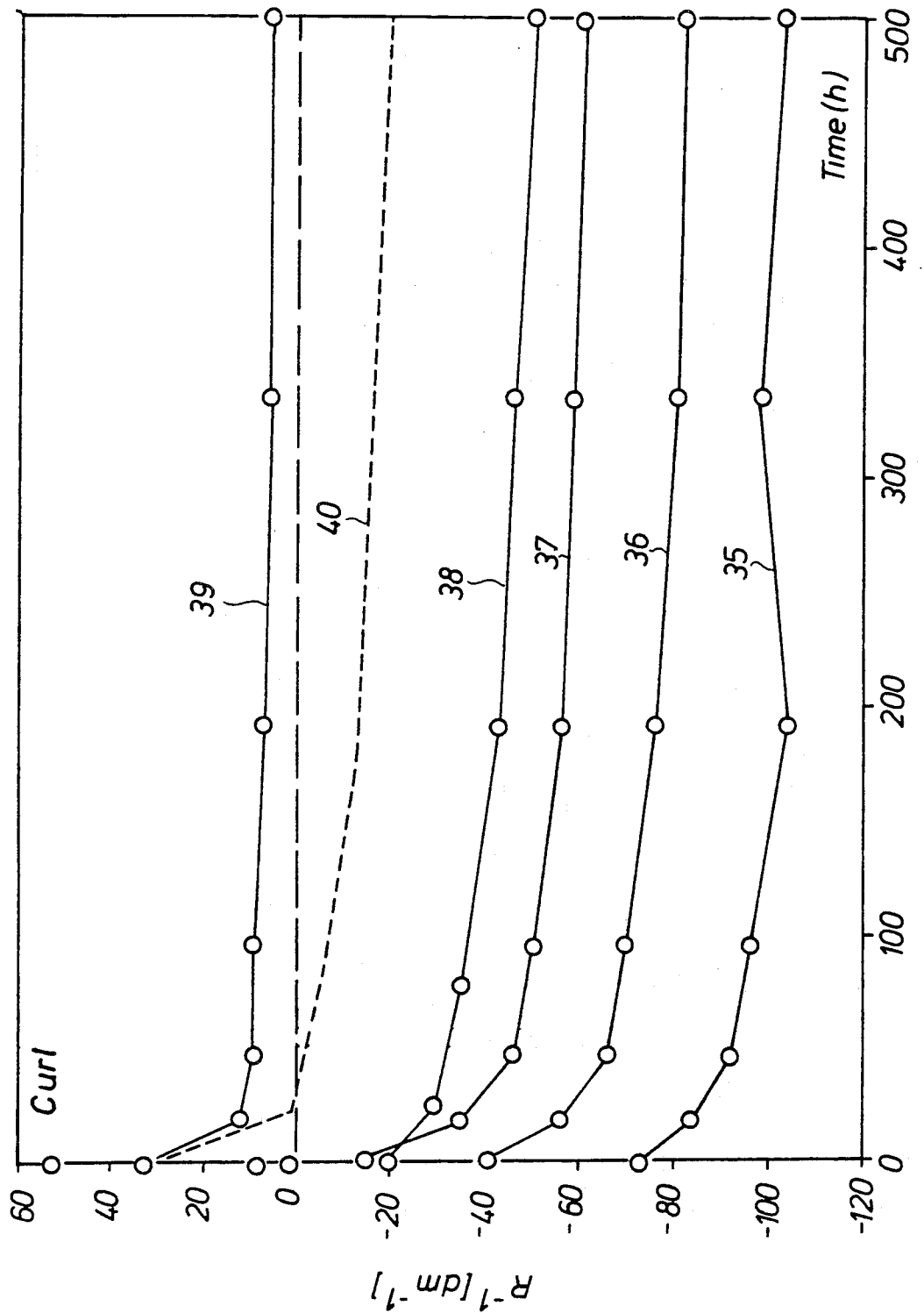

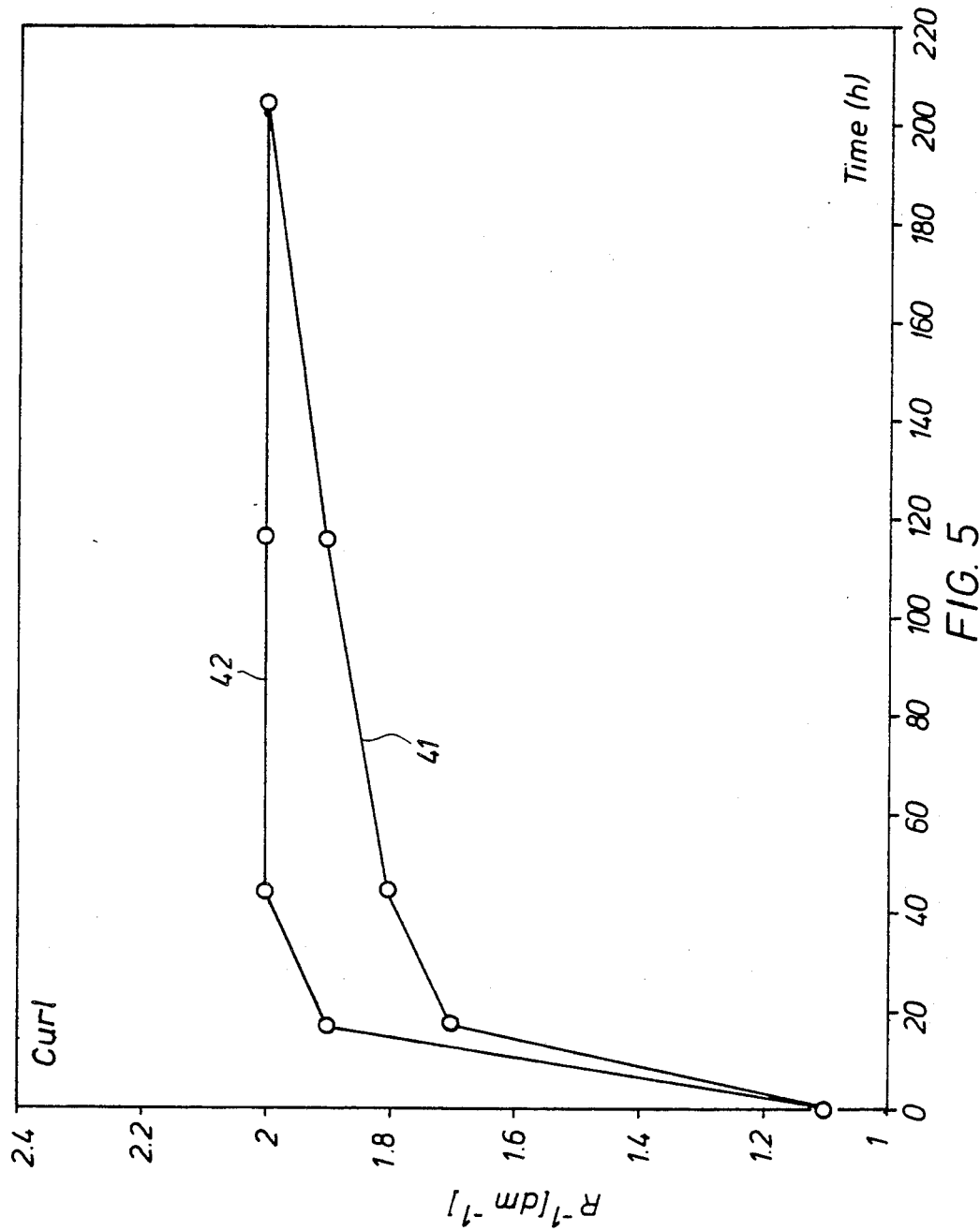

PROCESS FOR CONTROLLING THE CURL OF PHOTOGRAPHIC FILM

FIELD OF THE INVENTION

The present invention relates to a process for making oriented photographic polyethylene terephthalate film having a controlled amount of curl.

BACKGROUND OF THE INVENTION

Oriented polyethylene terephthalate film is a material that is affected at all stages of its life by the existence in the film of an inherent tendency to acquire a "set" on aging. The set may be referred to in the art as "core-set" when the set conforms to a core or tube on which the film has been wound and stored. The set can also occur in the absence of a core, for example when the film is rolled without a supporting core. The term "core-set" as used herein refers to both forms of set. Core-set may be explained as the result of plastic flow deformation imparted to self-supporting thermoplastic film when it is wound, and especially when it is wound on a core and stored at ambient conditions of temperature and relative humidity for a period of time sufficient for the film to acquire a substantially permanent curvature in the direction of its winding on the core. Core-set increases with increasing storage temperature and storage time and with decreasing roll diameter.

The problem of development of undesirable amounts of core-set in polymer films during storage in roll form is especially troublsome in the processing and use of photographic elements which comprise a high core-set-prone thermoplastic polymeric support material, especially polyethylene terephthalate. A high degree of curling tendency, or core-set-proneness, is particularly undesirable when the film element is intended to be used in that form, such as a microfiche. Such a film element, in its usual form, is a substantially flat piece of processed transparent photographic film usually measuring about 4" high and 6" wide, which bears projectionable micro-sized photographic images. Microfiche are widely used in storage and retrieval of information which can be projected and viewed on display panels or screens of readers or reader/printers. Efficient making, processing, storing, retrieving, reading and returning to storage of such small discrete film elements by high speed machines in trouble-free fashion require a high degree of flatness, or lack of core-set, in the film element.

It has been proposed to heat-temper a self-supporting film to reduce the core-set curling tendency of said film without distorting or shrinking said film by maintaining the film, while in the form of a stock or supply roll of film, for a period of from about 0.1 to about 1500 hours at a temperature ranging from about 30° C. up to the Tg (glass transition temperature) of said polymer and an ambient relative humidity less than 100% until the core-set curling tendency of the film is reduced by at least 15%. This method is disclosed in U.S. Pat. No. 4 141 735. It suffers from the disadvantage that the reduction in curling tendency may not be sufficient in all cases, especially in those cases where the technique is used for controlling the core-set proneness of film that is wound in the form of strips onto small cores, such as 35 mm amatuer film wound on film spools with a core diameter as small as 12 mm.

It has also been proposed to control the curling tendency of a longitudinally stretched film, that already has a certain coiling tendency in one direction by coiling the film in the opposite direction onto a relatively small roll. If the film remains in the coiled-up condition for a considerable time, there is a tendency for the curl caused by the longitudinal stretching process of the film to be partially offset by the core-set. This technique is disclosed in GB-A-1 030 288. The method of the UK patent comprises the longitudinal stretching of a film by contacting on film surface in succession with one heated and one cooled roller, the other film surface being urged in contact with the temperature-controlling rollers by means of rubber-like nip rollers. This stretching technique is unsuited for the production of a polymeric film base for use as a support for photographic film, because the surface quality of suchlike film does not meet the stringent quality requirements of the photographic industry.

Further, there exists a process for making biaxially oriented photographic polyethylene terephthalate film having a deliberately introduced amount of longitudinal curl, comprising extruding molten polyethylene terephthalate polymer through a flat die onto a cooling drum, subjecting the film to molecular orientation by stretching the cooled down film longitudinally and transversely, and heat-setting the film, wherein the film is longitudinally stretched by applying longitudinal stretching forces to the film while heating the film, said heating comprising first pre-heating the film to increase the film temperature but not sufficient for plastic elongation to occur, and then stretch-heating the film to a temperature above the Tg (glass transition temperature) in a zone where the film is not supported by any roller, whereby rapid plastic elongation occurs under the stretching forces, and next rapidly and symmetrically cooling the film to a temperature below the Tg to arrest the stretching, which is characterized in that the stretch-heating of the film is performed asymmetrically temperature wise so that a temperature gradient "Delta T" exists across the film thickness, i.e. from one surface of the film to the other, which is larger than 10° C., and that the longitudinal tension of the film during the stretching is less than 10 N/sq.mm.

This process is disclosed in EU-A1-0 299 560. If a film that has obtained a certain amount of longitudinal curl in accordance with this process, is coiled in the opposite direction onto a relatively small roll, as disclosed in GB-A-1 030 288 mentioned hereinbefore, there may be obtained film elements suitable as microfiches that show a reduced amount of curl, even after having been coiled into rolls for prolonged periods. The process according to EU-A1-0 299 560 does not permit, however one to obtain sufficiently large reductions of curling in the case of film wound on very small cores, such as 35 mm amateur film spools referred to hereinbefore.

Finally, it is known to make a film strip permanently coil-set for making a self-coiling film-sized sheet. This method is taught in U.S. Pat. No. 3,426,115.

DEFINITIONS

It is an object of the present invention to provide an improved process of curl control for photographic film.

The term "control" stands in the present specification for the intentional introduction of a certain amount of curl in a film. Depending on the later use of the film treated in accordance with the invention, the curl may fulfil the purpose of giving a film self-coiling properties, or the curl may compensate undesirable core-set that the film can be expected to acquire by its later winding on a small end-user spool. The term "small" stands for spool diameters ranging between 200 and 10 mm approximately, but said range is not intended to limit the application of the process according to the invention. The present invention is in particular concerned with the latter use of curl introduced into the film.

SUMMARY OF THE INVENTION

According to the invention, a process for making biaxially oriented photographic polyethylene terephthalate film having a controlled amount of longitudinal curl, comprises extruding molten polyethylene terephthalate polymer through a flat die onto a cooling drum, subjecting the film to molecular orientation by stretching the cooled film longitudinally and transversely while heating the film to a temperature above the Tg (glass transition temperature), the heating of the film during the longitudinal stretching occurring asymmetricaly thereby to establish a temperature gradient across the thickness of the film and to introduce into the film a given amount of curl, then heatsetting the film, winding the film to a stock roll of film, and subjecting the stock roll of film to a heat-tempering treatment by heating it for a period of about 0.1 to about 1500 h at a temperature ranging from about 30° C. up to the Tg and at an ambient relative humidity less than 100%.

The effect of the described process is surprising. As a matter of fact, it would have been expected that the deliberately introduced curl in the stock roll of film would have been reduced by the heat-tempering treatment, since a heat-tempering of a polymer film generally has a relaxation or annealing effect on the film. However, the result of the process according to the present invention is that the film curl is amplified.

The process of the invention generally further comprises the step of rewinding the stock roll of film on rolls of a diameter that is smaller than that of the stock roll of film and in a winding direction that causes a core-prone curl that is opposite to the curl which the film has obtained during the longitudinal stretching. In performing the mentioned rewinding step it becomes even possible to overcompensate the core-set curl caused by even quite small cores with a diameter down to 10 mm onto which the film is rewound.

Whereas in principle the film may be rewound in widthwise entirely, it will be understood that in practice the stock roll of film, after having undergone successive coating and drying treatments, accompanied by corresponding winding and rewinding operations, will eventually be longitudinally slit into narrow bands or strips, and transversely cut in shorter lengths which are then wound onto small rolls in the finishing equipment of the manufacturer.

The asymmetric heating of the film may be done according to a suitable embodiment of the invention in accordance with the process disclosed in EU-Al-0 299 560 mentioned hereinbefore. This process offers a good control of the desired "pre-curl" that is built-in in the stock roll of film, so that this pre-curl may be optimally adjusted for compensating the end-curl the film will get by its later winding on small cores that will carry the end-product for the user.

According to a suitable embodiment of the invention, the heat-tempering treatment of the film is done by heating the film for a period for approximately 24 to 240 hours at a temperature from about 50° C. to 80° C.

According to a further suitable embodiment of the invention, the heat-set film is wound-up to a stock roll with its surface that was subjected to the highest longitudinal stretching temperature, facing inwardly of the roll. In this way the curling tendency that is produced by the stock roll itself—although small because of the relatively large diameter of this roll—in practice between approximately 275 and 1000 mm for film lengths between 500m (thickness 50 micrometer) and 2400m (thickness 175 micrometer)—amplifies to some extent the pre-curl introduced during the longitudinal stretching of the film.

The term "a given amount of curl" denotes in the present specification (unless otherwise specified, cfr. the very small winding diameters) a longitudinal curl of the film at least equal to 5 mm, if measured in accordance with test method C of the international standard ISO 4330-1979 (E) for the determination of the curl of photographic film. This test method is particularly intended for film in sheet form or microfiche format, and it is a practical way of measurement that combines the effects of film curl with gravity. According to the test procedure, a sheet to be measured is placed with the concave side upwardly on a horizontal table at the end of a conditioning period and without removing the sheet from the conditioned atmosphere. The distance between the four corners of the test sheet and the table is measured in millimeters to the nearest millimeter, and then the arithmetical average value is calculated. The film sheets measured 4"×6" in the present measurements.

The term "glass transition temperature" (Tg) is described hereinafter in more detail.

If a melt of a non-crystallisable polymer is cooled it becomes more viscous and flows less readily. If the temperature is reduced low enough the polymer becomes rubbery and then as the temperature is reduced further it becomes a relatively hard and elastic polymer glass. The temperature at which the polymer undergoes the transformation from a rubber to a glass is known as the glass transition temperature, Tg. The ability to form glasses is not restricted to non-crystallisable polymers. Any material which can be cooled sufficiently below its melting temperature without crystallising will undergo a glass transition. There is a dramatic change in the properties of a polymer at the Tg. For example, there is a sharp increase of the stiffness and a substantial decrease of the thermal expansion coefficient. One of the most widely used methods of determining the Tg is by measuring the specific volume of the polymer sample as a function of the temperature. In the states above and below the glass transition temperature there is a linear variation in specific volume with temperature, but in the vicinity of the Tg there is a change in slope of the curve which occurs over several degrees. The Tg is normally taken as the point at which the extrapolation of the two lines meet. Another characteristic of the Tg is that the exact temperature depends upon the rate at which the temperature is changed. It is found that the lower the cooling rate the lower is the value of Tg that is obtained. It is also possible to detect a glass transition in a semi-crystalline polymer, but the change in properties at Tg is usually less marked than for a fully amorphous polymer.

In the literature the glass transition temperature of commercial polyethylene terephthalate has been reported to be about 67° C. for the amorphous polymer, about 81° C. for crystalline, non-oriented polymer and about 125° C. for high crystalline, biaxially oriented polymer.

The curling effect obtained according to the method of the invention is a consequence of a difference in orientation of the film, considered across the thickness of the film. The differences in orientation cause corresponding differences in physical properties such as the modulus of elasticity, the crystallinity, the refraction indices, and the coefficient of thermal expansion from one surface to the other of the film. Large difference in the coefficient of thermal expansion, and the E-modulus in particular, cause unequal longitudinal tensions in the film from one film surface to the other whereby the film will curl in the longitudinal direction. The film curl in the transverse direction is zero, since the inventive treatment does not cause any differential heating in the transverse direction of the film.

In the application the process according to EU-A1-0, 299 560, the obtained curling tendency of the film is also related to the average temperature of the film during the stretching and it has been shown that a higher average film temperature causes a higher film curl. The average film temperature is difficult to determine since the temperature gradient across the thickness of the film is not linear. Yet, it is the average temperature which the film has acquired during the stretch-heating, that determines the resistance of the film against its plastic deformation, or in other words that determines the longitudinal stretching force that is created in the film as a consequence of its stretching by a given amount (common stretch ratios are between 2.5 and 3.5). For that reason, the longitudinal tension of the film is used as the relevant factor that determines, in combination with the temperature gradient Delta T over the film thickness, the curling tendency of the film.

The term "Delta T" stands in the described process for the difference between the temperatures measured on both surfaces at a given place on the film. The temperature of any point between said surfaces of the film may be situated between the measured surface temperatures of the film, but it may happen that some film strata between the outer surfaces of the film, have a temperature that is lower than the temperature of either outer surfaces.

According to a further preferred embodiment of the process according to he invention, the temperature gradient across the film during the longitudinal stretching is larger than 10° C., and even more preferably larger than 15° C.

Further, the longitudinal stretching tension of the film is preferably smaller than 10 N/sq.mm, and even more preferably smaller than 7 N/sq.mm.

In the performance of the method according to EU-A1-0 299 560, it has been shown that the stretch-heating of the film may advantageously be done by exposing one film side to mediumwave IR-radiation and the opposite film side to shortwave IR-radiation. As mediumwave IR-radiation is considered in the present specification electromagnetic radiation within a range of approximately 2000 to 4000 nm, whereas shortwave IR-radiation is within a range of approximately 1000 to 2000 nm. The filament temperature of common medium wave IR radiators is of the order of magnitude of 900° C., whereas the filament temperature of short wave IR radiators is approximately 2100° C.

Shortwave IR-radiation is poorly absorbed by the film, and causes therefore a relative homogeneous heating of the film, resulting in a small Delta T over the film thickness.

Mediumwave IR-radiation, on the contrary, is rather well absorbed by the film and therefore causes an important increase in temperature of the outer film stratum facing the IR source, whereas the remaining of the film thickness is much less affected by the radiation.

As a result shortwave IR-radiation is well suited for determining the average temperature of the film, whereas the mediumwave IR-radiation is appropriate to selectively heat one surface of the film and thus control the temperature gradient Delta T across the film. In such a configuration, the film surface facing the mediumwave radiation, will obviously reach a higher temperature.

The cooling of the film at the end of the longitudinal stretching is preferably done by conveying the film into a body of cooling liquid. This has the advantage that the longitudinal stretching of the film may be stopped rapidly whereby the necking-in of the film under the influence of the stretching forces may be reduced. Further information about this technique may be found in EU-B1-22278.

As commonly known in the photographic film manufacturing art, the presence of a gelatin, or other hydrophilic coating or subbing layer on one surface of a hydrophobic film will cause the film to curl towards the coated surface when humidity is decreased due to loss of moisture in the coating layer. The presence of such a hydrophilic layer must be taken into account in making comparisons of curl values. In the examples of the present specification, the film samples were cut from uncoated film. For convenience of comparison, all curl values were determined at 50% of relative humidity in order to minimize the effects of abnormal ambient relative conditions.

BRIEF DESCRIPTION OF THE DRAWINGS

The process according to the present invention will be described hereinafter by way of example with reference to the accompanying drawings, wherein:

FIG. 3a is a diagram illustrating the evolution of film curl for two film sheets at 20° C., whereas FIG. 4 is a diagram illustrating the evolution of film curl for film strips that were subjected to different treatments, resp. treatment combinations, and FIG. 5 is a diagram illustrating the increase of film pre-curl as a consequence of heat-tempering.

DETAILED DESCRIPTION OF THE INVENTION

Figure 1:
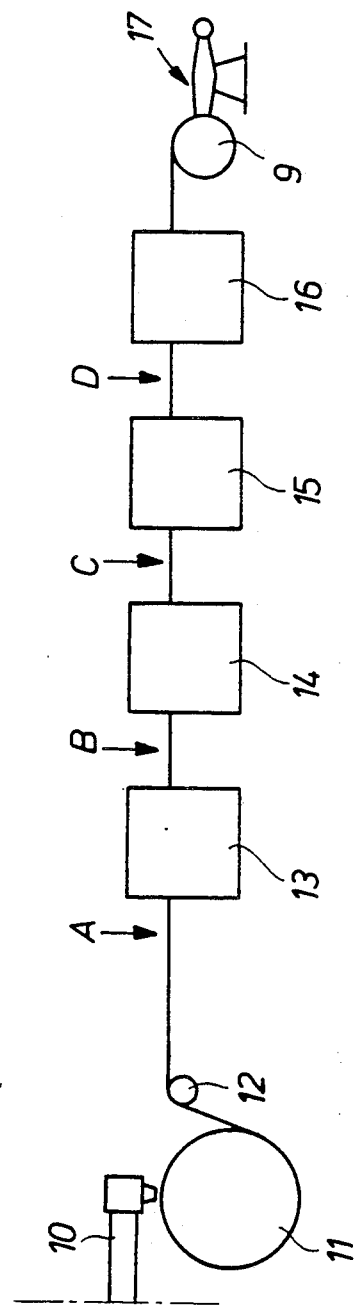
FIG. 1 is a diagrammatic illustration of an equipment for producing stretched polymeric film.

Referring to FIG. 1, a typical equipment for the production of biaxially stretched and heat-treated polymer film comprises an extruder 10 for the extrusion of the film polymer in the form of a molten polymer curtain, a cooling roller 11 for cooling the film to below its Tg, a guide roller 12, a longitudinal stretching device 13 wherein the film is stretched longitudinally while at a temperature above its Tg, a transverse stretching device 14 where the film is stretched transversely while at a temperature above its Tg, a heat-setting zone 15 where the film is kept at a temperature between the Tg and the Tm (melt temperature) of the polymer, while the film is prevented from shrinking, in order to increase the crystallinity of the film, a heat-relaxing device 16 where the film is held at a reduced longitudinal tension while it is heated, and finally a wind-up station 17 where the film is wound on a stock roll 9.

In stages of the production process as indicated e.g. by the points A, B, C and D, the film may be coated with one or more subbing layers in view of the application of one or more photographic layers in a later stage of the production process. The subbing layers may be coated on one or both sides of the film, in the form of a monolayer or of twin layers. The photographic layers may include gelatinous light-sensitive, colour filter, protective and other layers.

Figure 2:
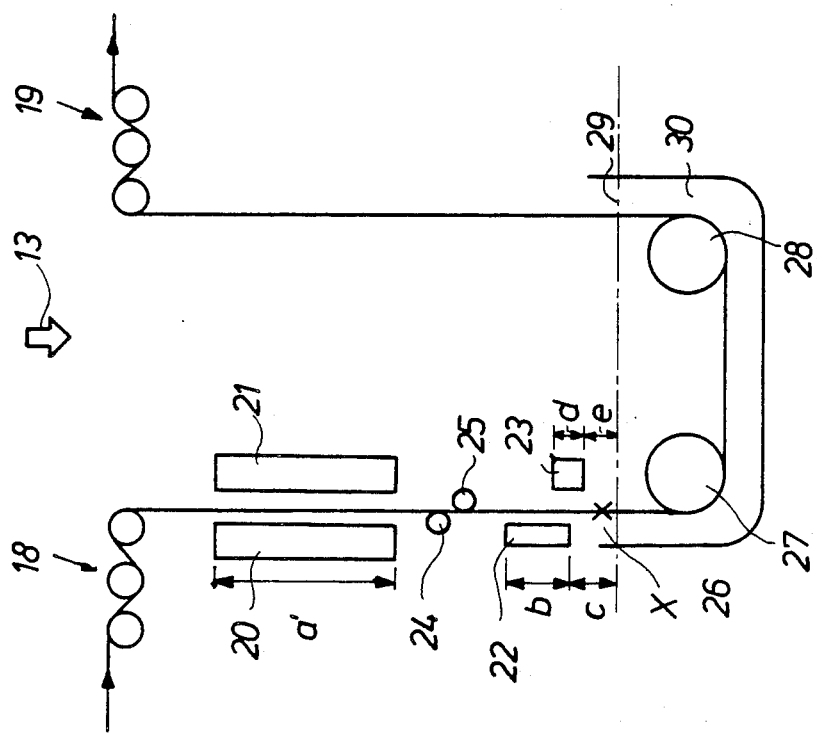
FIG. 2 is a diagrammatic detail view of one embodiment of a longitudinal stretching device in the equipment of FIG. 1 for the asymmetric heating of a film.

The longitudinal stretching device 13 of FIG. 1 is illustrated in detail in FIG. 2. The device comprises slowly and rapidly rotating traction means for causing a longitudinal traction on the film. In the present example, the traction means comprise sets of driven rollers 18 and 19 around which the film is wrapped for establishing a good contact. The rollers may be hollow metal rollers that can be at least one temperature-controlled, but each roller set may also be in the form of suction roller that is capable of transmitting a traction force to the film uniformly.

The pre-heating of the film to a temperature at which plastic elongation of the film yet does not occur, is done by means of first IR-heaters 20 and 21 disposed symmetrically at both sides of the downward film path. The heaters comprise a plurality of rodlike-IR heater lamps that are mounted in a rectangular casing with an open front, and in a plane close to the plane of the film. A forced current of cooling air is maintained through each casing for keeping the temperature under control.

The stretch-heating of the film is done by means of second IR-heaters 22 and 23 that are capable of creating an asymmetric heating of the film, to an extent such that a temperature difference Delta T is obtained between the two sides of the film of at least 10° C., and also such that stretching of the film can take place under the influence of the speed difference between the rollers 18 and 19, at a longitudinal tension that is less than 10 N/sq.mm.

The film stretching temperatures at both sides of the film were measured in the present embodiment at point X which was at 20 mm from the level of the cooling liquid 30. The measurements were made by means of a common pyrometer.

The longitudinal tension of the film was determined in dividing the actual stretching force by the film cross section.

In the present embodiment, the heater 22 is a medium wave heater whereas the heater 23 is a shortwave heater. The effective lengths of the heating gaps of the different heaters have been indicated by a', b and d, respectively.

Between the pre-heaters and the stretch-heaters two free-rotating rollers 24 and 25 may be provided, for causing a slight deviation of the film path and preventing thereby vibration of the weakened film under the longitudinal stretching forces.

The cooling section comprises a container 26 with two free-rotating rollers 27 and 28 below the level 29 of a body of cooling water 30. Means are provided, not illustrated, for controlling the level of the cooling water, and for circulating, filtering, and temperature-controlling the water. Further details about an installation of this kind may be found in EU-B1-22278 already referred to. Such details are not required for the understanding of the operation of the present embodiment.

Stock rolls 9 of film support material which are manufactured as described hereinbefore, are transferred to a heating chamber where the required conditions of heat-tempering, namely a controlled temperature at a controlled relative humidity, can be maintained for the period of heat-tempering. Occasionally, such heating chamber may be arranged for performing a controlled cooling down of the heat-tempered rolls of film.

The heat-tempered stock rolls of film may then be transferred to coating and drying installations, for receiving in one or more passages, one or a plurality of layers such as light-sensitive, color filtration, anti-stress, antihalation, curl controlling backing layers, etc. Each passage through a different coating installation requires the unwinding and rewinding of the roll of film. The stock rolls of film thus obtained, are finally sized in a finishing installation where they are longitudinally slit, and transversely cut for producing shorter narrower lengths of film that are finally wound on small end-user spools. The end rolls of film may also be wound without a core and it should be understood that for the purposes of the curling control according to the present invention it makes no difference whether an end film roll is wound on an actual core or not, as mentioned already in the introduction of the specification The film curl that may be obtained with the process according to the present invention, is described hereinafter with reference to the examples, that all relate to film without any light-sensitive, or without any subbing layer, in order to exclude the occasional influence of such layer(s) on the curling behaviour of the film.

EXAMPLES OF THE INVENTION

EXAMPLE 1

A polyethylene terephthalate polymer having an inherent viscosity of 0.57 dl.g$^{-1}$ was extruded at a rate of 150 kg.h$^{-1}$ and at a temperature of 290° C., through a conventional elongate extrusion die 10 having an orifice with a width of 2.5 mm. The molten polymer was received on a cooling drum which was driven at a rate of 6 m.min$^{-1}$. The film temperature amounted to 25° C. as the film left the cooling drum 11. The film was fed to the rollers 18 of the longitudinal stretcher 13. These rollers were driven at a rate of 8 m.min$^{-1}$ and the film was maintained at a surface temperature of 25° C. The thickness of the film entering the stretcher 13 was 1100 micrometer.

The first IR-heaters 20 and 21 each comprise 8 parallelly spaced IR-lamps of the type "short wave-length", with a maximum electric power of 80 Watts/linear cm at a voltage of 625 V. The maximum of the emission spectrum of the lamps was situated at approximately 1170 nm. The lamps were gas-filled twin quartz tubes with a tungsten filament. The voltage applied to the lamps was 625 V. The distance between the lamps and the film was 50 mm. The distance a amounted to 400 mm. The surface temperature of the film leaving the heaters 20 and 21 amounted to 80° C.

The heater 22 of the second IR heaters comprises 8 parallelly spaced lamps of the type "middle wave-length" with a maximum electric power of 16.25 Watts/linear cm at a voltage of 220 V. The maximum of the emission spectrum was 2500 nm. The voltage applied to the lamps was adjustable. The distance b amounted to 160 mm and the distance c was 60 mm.

The heater 23 of the second IR-heaters comprises 5 parallelly spaced IR-lamps of the type "short wavelength" with a maximum power of 80 Watts/linear cm at a voltage of 625 V. The maximum of the emission spectrum was situated at approximately 1170 nm. The lamps had a Tungsten filament. The distance d amounted to 100 mm, and the distance e was 20 mm.

The stretch ratio of the film was 3.3:1.

The longitudinally stretched film was then stretched transversely to a ratio of 3.3, heat-set, heat-relaxed and wound onto a stock roll 9.

The thickness of the film on the stock roll amounts to 100 micrometer.

The film that has been longitudinally stretched in the described way obtained its curling as a consequence of the temperature gradient Delta T over the film thickness. The highest film temperature caused the smallest modulus of elasticity and the greatest coefficient of thermal expansion of the film material, whereas the lowest film temperature caused the highest E-modulus and the smallest thermal expansion coefficient. Said differential moduli of elasticity and thermal expansion coefficients, considered across the thickness of the film, caused the curling of the film once it was cooled. The concave side of the curled film is the side with the lowest modulus of elasticity and the highest thermal expansion coefficient, i.e., the side heated to the higher temperature.

The stock roll of film was then transferred to a heating chamber where the roll was kept for 192 hours at a temperature of 57° C. Finally, the stock roll of film was cooled and samples measuring 4"×6" were cut from the film, the longitudinal axis of the samples coinciding with the longitudinal axis of the film. The cut samples were wound on cores with a diameter of 50 mm. The winding of the samples occurred in such a direction that the initial film curl opposed the curl induced by the cores of 50 mm.

Figure 3B:
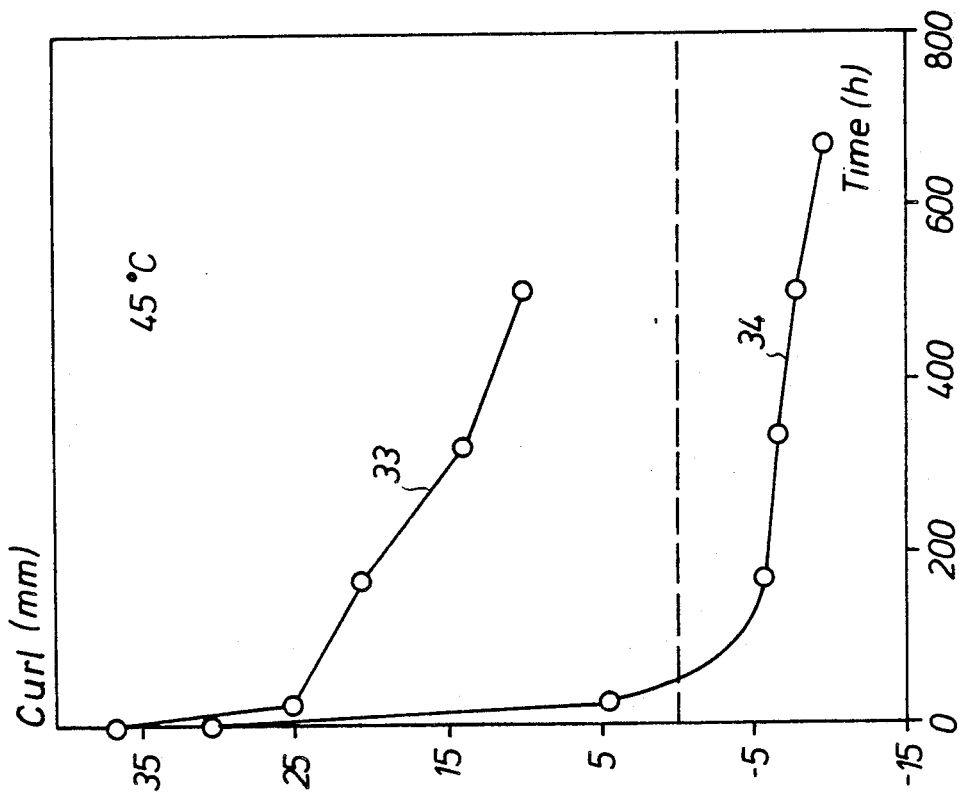
FIG. 3b is a diagram illustrating the evolution of film curl at 45° C.
Figure 3A:
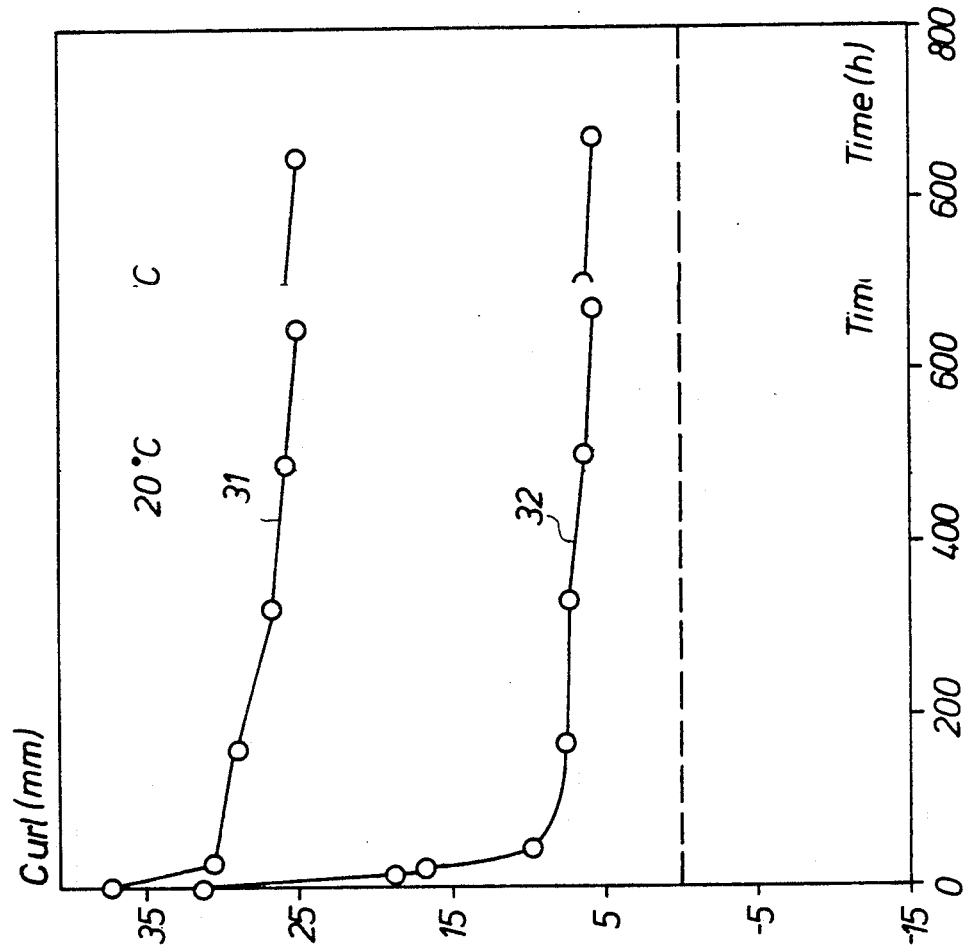

The diagram of FIG. 3a illustrates the evolution of the curl of film wound on the cores of 50 mm as a function of time and at a temperature of 20° C.

The ordinate of the diagram represents the amount of curl in mm, measured in accordance with test method C described hereinbefore, whereas the abscissa is a time axis in hours. The negative values represent the film curl in the direction of the 50 mm core, whereas the positive values represent the curl of a film sample in the opposite direction.

The curve 31 represents the curling behaviour of a sample that was cut from a film made in accordance with the inventive process described hereinbefore. This curve is the result of two opposing curling forces that operate on the wound film: one which makes the film curl away from the core and which is caused by the particular longitudinal stretching process, and one which makes the film curl towards the core and which is the core-set proneness of the film, described in the introduction of the specification. A perfect balance between both forces from the first to the last winding of a wound small roll of film is impossible in practice, since the first one is a constant for a complete roll of film, whereas the second varies is inverse proportion with the diameter of the wound film roll. Also the response as a function of time is not linear at all, as illustrated by the relatively major drop of the curve for the first 24 hours, as compared with the behaviour during the next 700 hours. It is clear that a serious "overcompensation" exists since the pre-curl that was introduced into the film during the longitudinal stretching process largely exceeds the effect of the core-set curl that normally produces a negative curl value in the diagram.

The surprising effect of the process according to the invention is demonstrated by the comparison of the curve 31 just described, with the curve 32 that represents the behaviour of a film sample that was subjected to the same asymmetric heating during the longitudinal stretching, but that did not undergo a heat-tempering treatment. The curve 32 is located approximately 20 curl mm lower than the curve 31, what indicates that the final curl of the film in curve 31 on the end core of 50 mm is less compensated than was the curl of the heat-tempered film sample. Thus, the offsetting effect of the deliberately introduced curl by the asymmetric longitudinal stretching process without heat treatment is smaller than the effect of the same process combined with heat-tempering which one would expect to reduce rather than to increase the effect of a previously introduced heat-dependent treatment. That is to say, the effect of the "positive" curl imparted by the asymmetrical stretch-heating operation in offsetting the "negative" curl imparted by the core-set action was stronger when the film was subjected to an intermediate heat-tempering or annealing treatment then when it was not, contrary to the normal expectation that any heat-tempering would relax and weaken any set imparted by heat treatment.

The diagram of FIG. 3b gives the same comparison of two film samples at a temperature of 45° C. The test at 45° C. is to be considered as an accelerated storage test, a time lapse of 16 h at 45° C. corresponding with a period of 6 to 12 months at a temperature of 20° C. The curve 33 stands for the film sample treated in accordance with the process according to the invention, whereas the curve 34 stands for the sample that did not undergo a heat-tempering while on the stock roll.

EXAMPLE 2

This example illustrates the evolution of film curl for very small winding radii. The example which is illustrated in FIG. 4 was made in order to have an insight in the extent of actual improvement that may be obtained by means of the inventive process, for the compensation of extreme core-set curl induced by very small cores. The latter situation occurs in particular in the field of amateur photography in which 35 mm film is wound on a core with a diameter of 12 mm as mentioned before.

The measurements were carried out on PET film strips measuring 35×50 mm, wound on a core of 12 mm diameter. The core-set curl of such small cores was so strong that the standard test method described in the introduction of this application could not be used. For that reason, the diameter of the curled film specimen was measured instead of the height of the upstanding corners. The results are expressed on the ordinate of the diagram as $R^{-1}$ ($dm^{-1}$), R being the radius of curvature.

The abscissa gives the ageing time in hours, at a temperature of 45° C.

The curve 35 corresponds to a triacetate film strip with a thickness of 130 micrometer and is included in the graph in order to illustrate the importance of film curl of this commonly used film base in amateur and cine photography. The core-set curl is very important but yet without much consequences in practice since the wet processing of a photographic material with triacetate as film base causes the almost complete disappearance of the curl, as commonly known. It is known that a triacetate film does undergo neither a longitudinal stretching, nor a heat-tempering treatment during its production process.

The curve 36 illustrates the core-set curl of a polyethylene terephthalate film strip with a thickness of 130 micrometer that did not undergo any curl-controlling treatment.

The curve 37 illustrates the core-set curl of a polyethylene terephthalate film strip with a thickness of 100 micrometer that was asymmetrically heated during the longitudinal stretching to obtain a curl of $R^{-1} = 3.5$ $dm^{-1}$.

The curve 38 illustrates a polyethylene terephthalate film strip with a thickness of 120 micrometer, and without any pre-curl, that was subjected to a heat-tempering treatment at 57° C. for 192 hours, before being wound onto the small core. The diagram shows that the heat-tempering treatment permits to obtain in the present case slightly better results than did the process of asymmetric heating during the longitudinal stretching.

Finally, curve 39 illustrates the effect of the use of the process according to the present invention, namely the asymmetric heating of the film during its longitudinal stretching, in conjunction with the heat-tempering of the stock roll. The effect is surprising, since not only it is better than that represented by the curve 37 whereas one should expect that the heat-tempering would have reduced by relaxation the pre-curl imparted to the film by the asymmetric heating during the longitudinal stretching, but it is even better than the result of the sum of heat-tempering and asymmetrical stretch-heating separately. This sum is shown schematically by the broken line 40 and has been obtained by drawing the curve 38 over 3.5 $dm^{-1}$ curl units higher in the diagram. The value of 3.5 $dm^{-1}$ is the starting level of the curve 37 at 0 h.

EXAMPLE 3

The diagram of FIG. 5 illustrates the influence of the operation of heat-tempering on a film that has acquired a certain amount of curl during its longitudinal stretching.

The measurements occurred on samples measuring $3'' \times 4''$ that were cut lenghtwise from a pre-curled film and they showed a curl of $R^{-1} = 1.1$ $dm^{-1}$. In the present example, the curl of the samples was calculated on the basis of the test method C described hereinbefore, but the curl values thus obtained were re-calculated as a function of the length of the samples, i.e. $4''$, to obtain the corresponding curl radius of the samples.

The samples with the mentioned curl were then heat-tempered during different periods of time at a temperature of 57° C. and their remaining curl was measured after the heat-tempering, in order to find out how the curl evolved. The curve 41 represents the samples that were kept flat during the heat-tempering. The notion "flat" means that the samples were laid on a horizontal table with their concave side facing upwardly. The curve illustrates that the first 20 hours of heat-tempering produce a significant increase of the curl, whereas the further heat-tempering has a much smaller effect.

The curve 42 represents the samples that were heat-tempered while they were wound on a core with a diameter of 200 mm, the concave side of the samples facing towards the core. This test was done to find out what was the effect of a curvature of the samples during the heat-tempering. Although this curvature is small, as compared with that of the end-rolls, it was interesting to find out how the samples would behave.

The 200 mm diameter was choosen since this is the diameter of a commonly used core for the winding of the stock rolls.

The test shows that the curvature of the samples caused by the 200 mm core causes an acceleration of the curl during the first 20 hours of heat-tempering but that after a period of approximately 200 hours the end curl of $R^{-1} = 2$ $dm^{-1}$ was equal to that obtained by a flat film sample.

The process according to the present invention is not limited to the described examples.

The differential longitudinal stretch-heating of the film may be done in other ways than the illustrated one. The medium wave heater 22 may be replaced by a short wave heater, the power of which differs sufficiently from that of the shortwave heater 23 that a desired temperature gradient is obtained over the film.

The pre-heaters 20 and 21 may have different powers, so that these heaters cause already a certain temperature gradient across the film thickness.

The rollers 18 may be heated and arranged to cause an asymmetric pre-heating of the film.

In the illustrated embodiment of FIGS. 1 and 2, the film side that was in contact with the air while on the first cooling roller 11, was subjected to the medium wave stretch-heating. In this way, the curling tendency that is occasionally caused in the film by an asymmetric cooling due to the cooling roller, may amplify the effect of the curling obtained in accordance with the process of the invention. However, the curling tendency imposed by the cooling drum(s) is small, and therefore the position of the heaters 22 and 23 may also be reversed in practice.

The heat-tempering may occur at other conditions than those described in the examples. The heat-tempering may occur in two or more phases, each phase comprising a different temperature and/or time setting.

We claim:

1. A process for making biaxially oriented photographic polyethylene terephthalate film having a controlled amount of longitudinal curl, comprising extruding molten polyethylene terephthalate polymer through a flat die onto a cooling drum, to quench the same into film form, imparting to the quenched film a given degree of permanent curl by subjecting the same to molecular orientation by stretching longitudinally and transversely while heating the film to a temperature above its Tg, the heating of the film during the longitudinal stretching occurring asymmetrically from one film face to the other thereby to establish a temperature gradient across the thickness of the film sufficient to impart to the film the given degree of curl, then heat-setting the asymmetrically heat-stretched film, winding the heat-set film into a stock roll of film, and finally subjecting the film roll to a heat treatment by heating it for a time of about 0.1 to about 1500 hours at a temperature ranging from about 30° C. up to its Tg and at an ambient relative humidity less than 100% and sufficient to thereby at least substantially maintain the degree of curl previously imparted to the film.

2. A process according to claim 1, wherein the final heat treatment is for a time between 24 and 250 hours at a temperature ranging between 50° and 80° C.

3. A process according to claim 1, wherein the temperature gradient across the film thickness during the longitudinal stretching is larger than 10° C., and the film during the longitudinal stretching is subjected to a longitudinal tension of less than 10N/sq.mm.

4. A process according to claim 1, wherein the temperature gradient is larger than 15° C.

5. A process according to claim 3, wherein the film is subjected during said stretching to a longitudinal tension of less than 7 N/sq.mm.

6. A process according to claim 1, wherein the longitudinal stretch-heating of the film occurs by exposing the opposite film faces to IR-radiation of different intensities.

7. A process according to claim 6, wherein one face is exposed to medium wave IR-radiation and the other face to short IR-radiation whereby the one face reaches the higher temperature.

8. A process according to claim 1, wherein the longitudinal asymmetrically heat-stretched film is cooled by the conveying the same through a body of cooling liquid.

9. A process according to claim 1, wherein the asymmetrically heat-stretched and heat-set film is heat-relaxed prior to its winding into a stock roll of film.

10. A process according to claim 1, wherein the asymmetrically heat-stretched and heat-set film is wound into a roll with the film face that was subjected to the higher longitudinal stretching temperature facing inwardly of the roll.

11. A process according to claim 1, comprising rewinding the stock roll of film into rolls of a smaller diameter and in a winding direction that is opposite to the direction of the curl imparted to the film during the longitudinal asymmetrical heat-stretching.

12. A process according to claim 1, comprising unwinding and coating the stock roll of film, slitting and cutting the film into longitudinal strips and winding the several film strips thus obtained each separately into small rolls, the film surface that was subjected to the higher longitudinal stretching temperature facing outwardly of the small rolls.

13. A method of compensating for the core-set acquired by biaxially oriented photographic polyethylene terephthalate film when wound in rolls on small diameter cores, comprising the steps of subjecting a polyethylene terephthalate film obtained by extrusion through a flat die onto a cooling drum and quenching into film form, to molecular orientation by stretching the same longitudinally and transversely while heating the film to a temperature above its Tg, the heating of the film during the longitudinal stretching occurring asymmetrically from one film face to the other thereby to establish a temperature gradient across the thickness of the film sufficient to impart to the film a given amount of curl in a given direction, then heat-setting the asymmetrically heat-stretched film, winding the heat-set film into a stock roll of larger diameter than said core, subjecting the film roll to a heat treatment by heating it for a time of about 0.1 to about 1500 hours at a temperature ranging from about 30° C. up to its Tg and at an ambient relative humidity less than 100% and sufficient to at least substantially maintain the degree of curl previously imparted to the film, and winding the resultant film onto a small diameter core having a curvature opposite to said direction of curl imparted by the longitudinal stretching step.

* * * * *